United States Patent
Hachisuka et al.

[11] Patent Number: 5,162,631
[45] Date of Patent: Nov. 10, 1992

[54] POWER SUPPLY UNIT FOR ELECTRICAL DISCHARGE MACHINE

[75] Inventors: Hisao Hachisuka; Akihiro Komori, both of Nagoya, Japan

[73] Assignee: Brother Kogyo Kabushiki Kaisha, Nagoya, Japan

[21] Appl. No.: 530,794

[22] Filed: May 30, 1990

[30] Foreign Application Priority Data

May 30, 1989 [JP] Japan .................. 1-137208

[51] Int. Cl.⁵ .............................. B23H 1/02
[52] U.S. Cl. .............. 219/69.13; 219/69.12; 323/283
[58] Field of Search ........ 323/283, 285, 282; 219/69.13, 69.18, 69.12

[56] References Cited

U.S. PATENT DOCUMENTS

| | | | |
|---|---|---|---|
| 4,361,745 | 11/1982 | Rupert | 219/69.13 |
| 4,460,815 | 7/1984 | Bell, Jr. et al. | 219/69.18 |
| 4,590,353 | 5/1986 | Obara et al. | 219/69.13 |
| 4,695,696 | 9/1987 | Ozaki et al. | 219/69.18 |
| 4,954,767 | 9/1990 | Buisson et al. | 323/283 |

FOREIGN PATENT DOCUMENTS

| | | | |
|---|---|---|---|
| 56-163836 | 12/1981 | Japan | 219/69.18 |
| 57-211424 | 12/1982 | Japan | 219/69.13 |
| 59-64224 | 4/1984 | Japan. | |

*Primary Examiner*—Geoffrey S. Evans
*Attorney, Agent, or Firm*—Oliff & Berridge

[57] ABSTRACT

An electrical discharge machining power supply unit which detects fluctuations in the voltage of a DC power source (3) and sends a signal to an A/D converter (5) and has a microprocessing unit (8) to change the on-time of a transistor switching element (12) in inverse proportion to the rate of voltage fluctuations computed by the microprocessing unit (8), thereby maintaining the voltage supplied across the electrode (1) and workpiece (2). In a second embodiment a pilot power supply and a current detecting element for detecting a dielectric breakdown of the gap is used.

5 Claims, 3 Drawing Sheets

POWER SUPPLY UNIT FOR ELECTRICAL DISCHARGE MACHINE

BACKGROUND OF THE INVENTION

The present invention relates to a power supply unit for use in an electric discharge machine (EDM), and more particularly to an EDM power supply unit capable of changing a pulse width of a discharge current depending upon fluctuation of the power supply voltage.

An electrical circuit arrangement of a prior art EDM is shown in block form in FIG. 1. The circuit includes a regulated D.C. power supply 101, a resistor 102 connected in series with the power supply 101, a capacitor 105 having one terminal connected to the resistor 102 and another terminal connected to the power supply 101, and a switching transistor 104 interposed between the power supply 101 and the resistor 102. A pulse generator 103 is connected to the switching transistor 104 for ON-OFF controlling the latter. A machining electrode 106 and a workpiece 107 disposed in confronting relation to each other are connected across the capacitor 105.

According to the above-described electrical arrangement, the transistor 104 is cyclically rendered on and off in response to pulse signals fed from the pulse generator 103 which signals are produced at a constant time interval. Discharge machining is carried out in accordance with a voltage developed across the capacitor 105 which voltage has been maintained at substantially constant due to the regulated power supply 101.

However, it has been required that the EDM have a large output capability. To comply with such a requirement, the regulated power supply needs to be large in capacity. However, such a power supply is large in size and expensive in cost.

SUMMARY OF THE INVENTION

The present invention has been made in view of the foregoing, and accordingly it is an object of the invention to provide a power supply unit for use in an electrical discharge machine, which is small in size and inexpensive in cost. The power supply unit in accordance with the present invention supplies an output whose level changes depending on the fluctuation of the input. Specifically, the power supply voltage is detected and the duration of the discharge current supplied to the wire electrode is controlled in response to the power supply voltage detected.

To achieve the above and other objects, there is provided a power supply unit for use in an electrical discharge machine wherein a workpiece is machined with discharge occurring between the workpiece and a wire electrode, the device comprising a power supply for applying a voltage to a gap between the wire electrode and the workpiece disposed in confronting relation to each other, switching means for ON-OFF controlling the application of the voltage and applying a discharge energy to the gap, voltage detection means for detecting the voltage across the power supply and outputting a first signal indicative of the detected voltage, and control means responsive to the first signal for controlling the switching means so that the discharge energy applied to the gap is substantially maintained at constant. The first signal is in an analog form. The control means comprises an analog-to-digital converter connected to the voltage detection means for converting the analog signal to a digital signal, the digital signal having a high level duration corresponding to the voltage detected by the voltage detection means, and a microprocessing unit connected to the analog-to-digital converter for receiving the digital signal therefrom, the microprocessing unit computing a rate of the voltage detected by the voltage detection means with respect to a reference voltage and outputting a second signal applied to the switching means, the second signal causing the switching means to change a duration of ON state in inverse proportion to the rate computed by the microprocessing unit.

In accordance with the present invention, the discharge energy applied to the gap is substantially maintained at constant regardless of the fluctuation of the power supply voltage.

The above and other objects, features and advantages of the present invention will become more apparent from the following description when taken in conjunction with the accompanying drawings in which preferred embodiments of the present invention are shown by way of illustrative examples.

DESCRIPTION OF THE PREFERRED EMBODIMENTS

Figure 1:
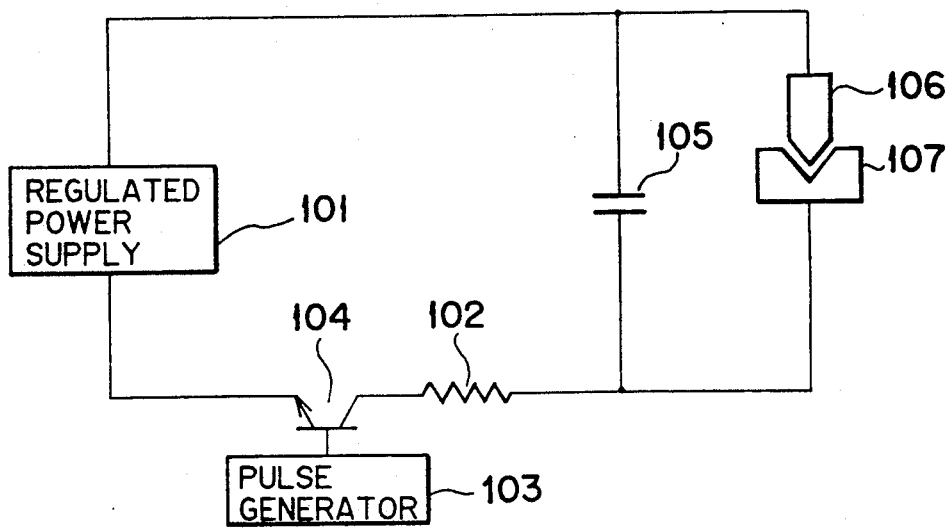
FIG. 1 is a prior art electrical circuit arrangement of an electrical discharge machine.
Figure 2:
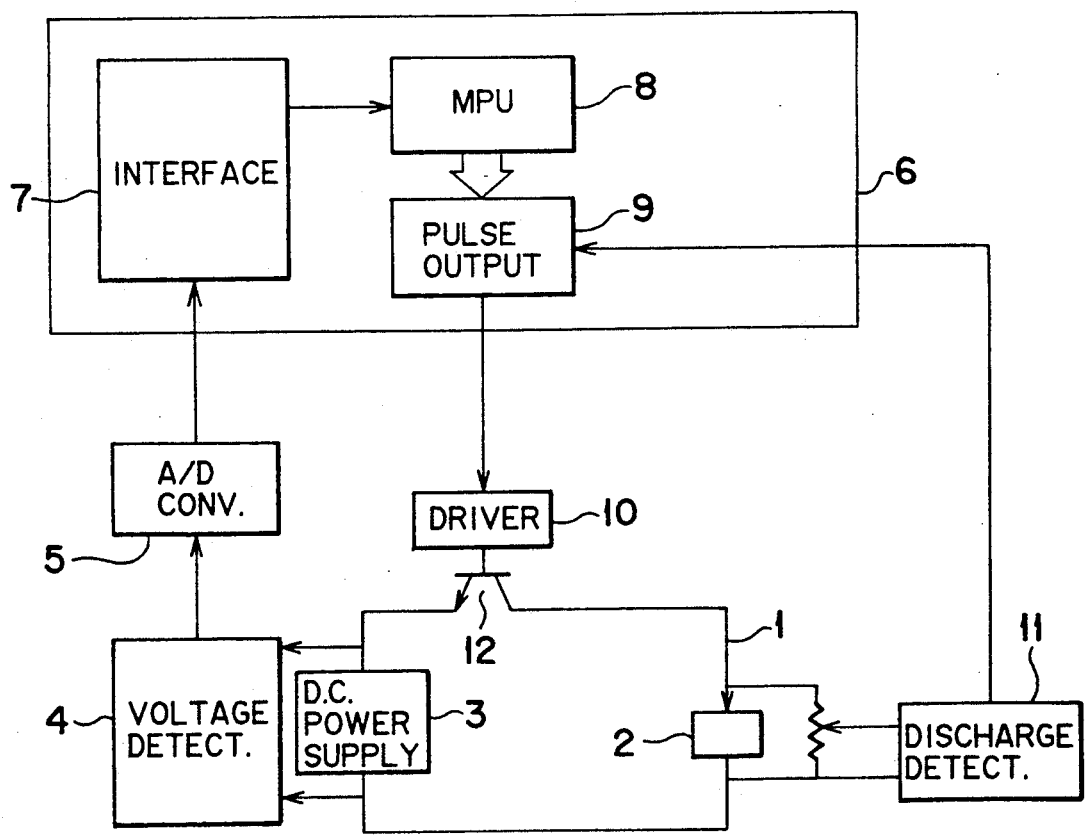
FIG. 2 is an electrical circuit arrangement of an EDM power supply unit according to one embodiment of the present invention.

Referring to FIG. 2, a first embodiment of an EDM power supply unit in accordance with the present invention will be described.

A voltage detecting circuit 4 is connected in parallel to a D.C. power supply 3 for detecting the voltage of the power supply 3. An analog-to-digital (A/D) converter 5 is connected to the output of the voltage detecting circuit 4 for converting the voltage detected by the voltage detecting circuit 4 to a digital signal. A controller is denoted by reference numeral 6 which includes an interface 7 connected to the A/D converter for receiving the digital signal therefrom. In the controller 6, there is further provided a microprocessor (MPU) 8 and a pulse output circuit 9. The microprocessor 8 is connected to the interface 7, in which the width of the output pulse received from the interface 7 is subjected to addition/subtraction processing. The resultant pulses are outputted to the pulse output circuit 9.

A drive circuit 10 is connected to the output of the pulse output circuit 9, and a switching device 12, such as a transistor, is in turn connected to the output of the driver circuit 10. The switching device 12 is subjected to ON-OFF control in response to the output fed from the driver circuit 10. The switching device 12 is connected to a wire electrode 1 which passes through a gap formed in a workpiece 2. A discharge detecting circuit 11 is connected across the workpiece 2 and the wire electrode 1 for detecting a gap voltage.

In operation, when the EDM operates, electrical discharges are intermittently taken place between the electrode 1 and the workpiece 2. The voltage across the power supply 3 is detected by the voltage detecting circuit 4. The voltage across the power supply 3 fluctuates caused by, for example, changes of the load, i.e., the workpiece, and/or the fluctuation of the power supply voltage. The voltage detecting circuit 4 detects the voltage fluctuation of the power supply 3 and the output fed from the voltage detecting circuit 4 is digitized in the A/D converter 5. The digital output from the A/D converter 5 is fed to the controller 6. The digital signal received from the A/D converter 5 is subjected to addition/subtraction in the microcomputer 8 so that the pulse width or duration of the output digital signal is prolonged or shortened. By this control, the discharge energy supplied to the gap between the wire electrode 1 and the workpiece 2 is maintained substantially at constant. The output from the microcomputer 8 is fed to the pulse output circuit 9. The latter circuit outputs a pulse to the drive circuit 10 in timed relation to the rising edge of the signal fed from the discharge detecting circuit 11. Then, the switching device 12 is ON-OFF controlled in response to the output from the drive circuit 10.

Figure 4:
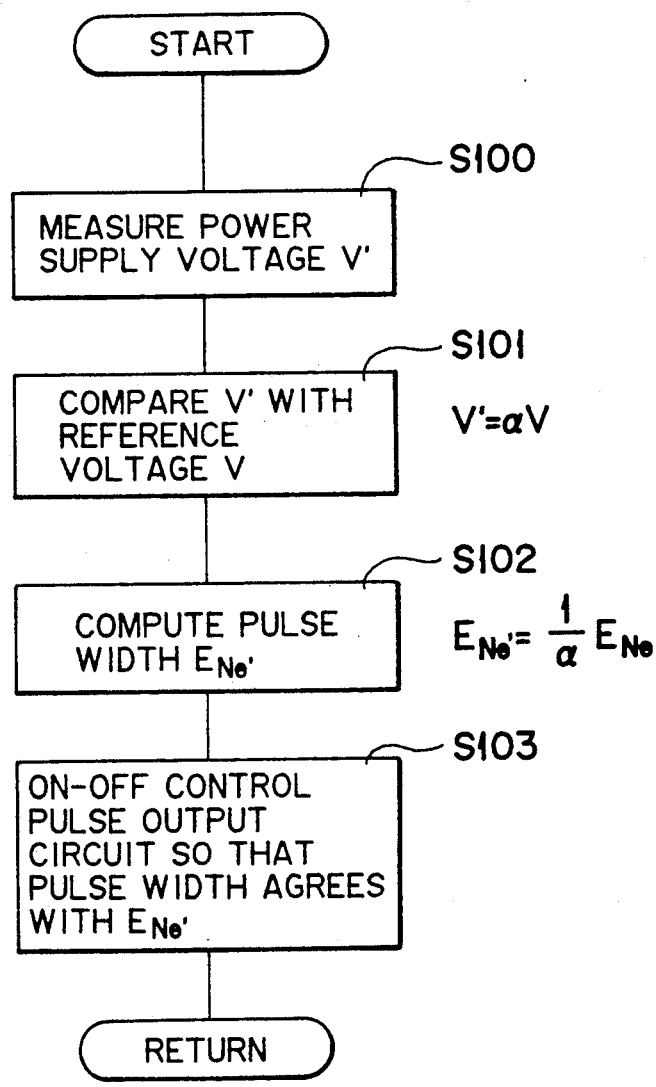
FIG. 4 is a flow chart for description of the operation of the EDM power supply unit according to the present invention.

Referring to the flow chart of FIG. 4, the operation of the circuit in FIG. 2 will be described in far more detail.

In step 100, the power supply voltage (V') is measured by the power supply voltage detecting circuit 4. The voltage thus measured is compared with a reference voltage (V) and obtain $\alpha$ in an equation of V'=$\alpha$V (step 101). In the subsequent step, the pulse width $E_{Ne'}$ is computed based on the following equation.

$$E_{Ne'} = (1/\alpha)E_{Ne}$$

where $E_{Ne}$ represents a pulse width corresponding to the machining energy inputted by the operator. Thereafter, the microcomputer 9 performs ON-OFF control so that the output pulses supplied to the pulse output circuit 9 agree with the pulse width as mentioned above (step 103). When the operator inputs a numeral selected from 1 to 10 representing the level of the machining energy, the microcomputer determines the width of the pulse corresponding to the energy level selected by the operator. For example, with respect to the energy level 5, the pulse width is set to 1 microsecond.

Figure 5:
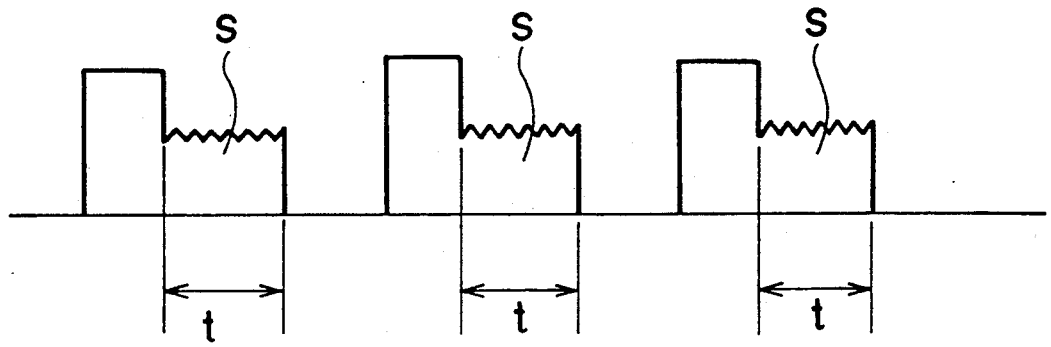
FIG. 5 is a waveform diagram showing output pulses from the EDM power supply unit of the present invention.

In FIG. 5, the machining energy is represented by character S. In order to maintain the machining energy at constant, the pulse width t is adjusted. Since 10% increase of the power supply voltage results in increase of the machining energy, the pulse width t is shortened by 10%, thereby maintaining the machining energy at constant.

In this manner, the pulse width is controlled depending on the power supply voltage detected. Accordingly, supply of stable machining energy is assured with a simple arrangement in comparison with the prior art arrangement. In addition, the machining accuracy can be stabilized, since the machining energy supplied to each timing is maintained substantially constant.

Figure 3:
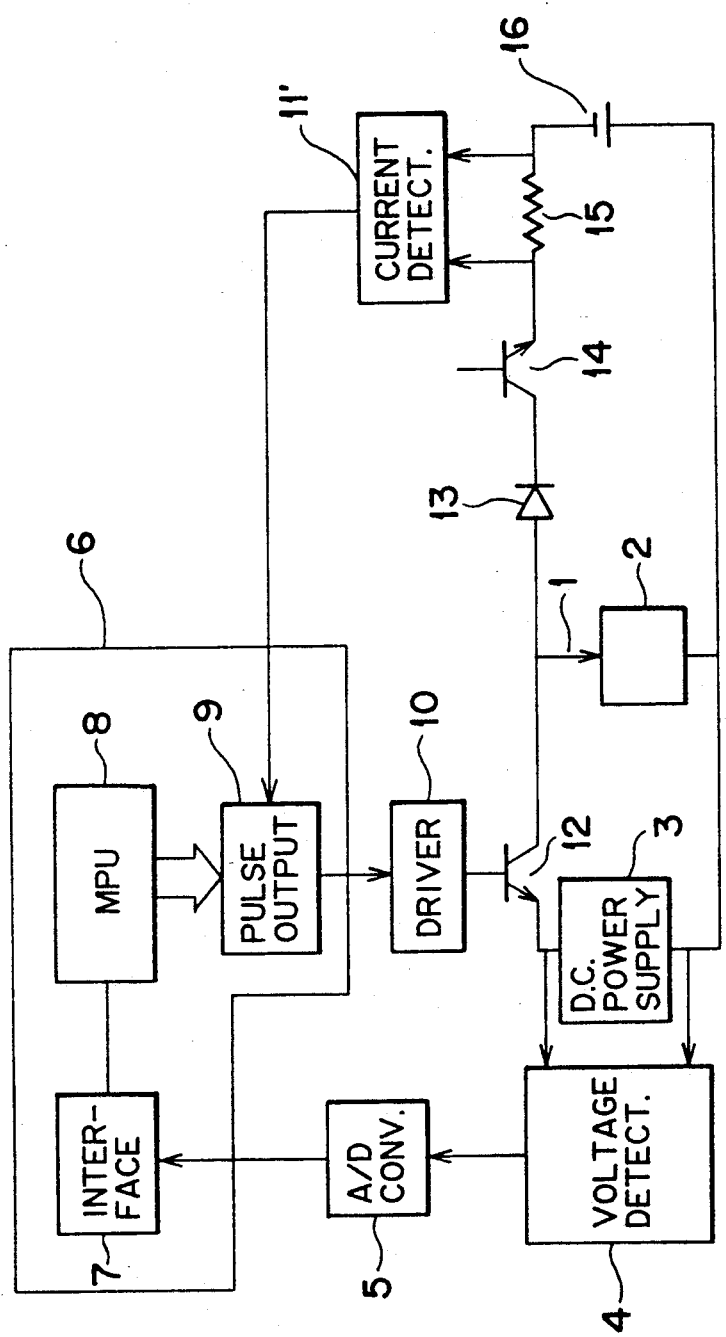
FIG. 3 is an electrical circuit arrangement of an EDM power supply unit according to another embodiment of the present invention.

Referring next to FIG. 3, a second embodiment of the present invention will be described. In FIG. 3, the same or similar components shown in FIG. 2 are denoted by the same or similar reference numerals, and duplicate description thereof is omitted.

The second embodiment differs from the first embodiment in that the second embodiment is of the dual power supply type having further a pilot power supply 16 and that a current detection circuit is employed for detecting a dielectric breakdown in the gap between the wire electrode 1 and the workpiece 2. The circuit arrangement shown in FIG. 3 includes a diode 13 to which a switching device 14 comprising a transistor is connected. It further includes a current detecting circuit 11' for detecting fluctuation of a current flowing through a resistor 15. The pilot power supply 16 is connected in series to the resistor 15.

In operation, when a switch 14 is rendered ON, there is a current flow through the diode 13 and the resistor 15 from the pilot power supply 16. The current flowing through the resistor 15 is detected by the current detecting circuit 11'. Similar to the first embodiment, in timed relation to the rising edge of the signal fed from the current detecting circuit 11', an output signal is fed to the drive circuit 9. In the second embodiment, after the dielectric breakdown in the machining gap is detected by the current detecting circuit 11', the switch 12 is rendered ON to there by apply the voltage of a main power supply to the wire electrode, thereby carry out machining of the workpiece 2.

Although the present invention has been described with reference to specific embodiment, it would be apparent for those skilled in the art that a variety of changes and modifications may be made without departing from the scope and spirit of the invention.

What is claimed is:

1. A power supply unit for use in an electrical discharge machine wherein a workpiece is machined with discharge occurring between the workpiece and a wire electrode, the device comprising:
   a power supply for applying a voltage to a gap between the wire electrode and the workpiece disposed in confronting relation to each other;
   switching means for ON-OFF controlling the application of the voltage and applying a discharge energy to the gap;
   voltage detection means for detecting the voltage across said power supply and outputting a first signal indicative of the detected voltage;
   control means responsive to the first signal for controlling said switching means so that the discharge energy applied to the gap is substantially maintained at constant, wherein
   the first signal is in an analog form, and said control means further comprises an analog-to-digital converter connected to said voltage detection means for converting the analog signal to a digital signal, and a microprocessing unit connected to said analog-to-digital converter for receiving the digital signal therefrom, said microprocessing unit computing a rate of the voltage detected by said voltage detection means with respect to a reference voltage and outputting a second signal applied to said switching means, the second signal causing said switching means to change a duration of ON state in inverse proportion to the rate computed by said microprocessing unit; and
   discharge detection mans for detecting the occurrence of the discharge and outputting a third signal, and wherein the second signal is applied to said switching means in response to the third signal.

2. A power supply unit according to claim 1, further comprising a pilot power supply having a first terminal for connection to the wire electrode and a second terminal for connection to the workpiece.

3. A power supply unit according to claim 2, further comprising current detecting means for detecting a dielectric breakdown of the gap between the wire electrode and the workpiece, said current detection means outputting a fourth signal indicative of the dielectric break down, and wherein the second signal is applied to said switching means in response to the fourth signal.

4. A power supply unit according to claim 3, further comprising a resistor interposed between the first terminal and the wire electrode and a switch element interposed between said resistor and the wire electrode.

5. A power supply unit according to claim further comprising a diode interposed between said switch element and the wire electrode.

* * * * *